US010139001B2

(12) United States Patent
Oguri et al.

(10) Patent No.: US 10,139,001 B2
(45) Date of Patent: Nov. 27, 2018

(54) CONTINUOUSLY VARIABLE TRANSMISSION

(75) Inventors: Takemi Oguri, Tokyo (JP); Minoru Kagawa, Tokyo (JP); Hiroyuki Kiryu, Tokyo (JP); Mitsuo Takano, Tokyo (JP); Nobuhiro Uchijima, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 675 days.

(21) Appl. No.: 12/926,927

(22) Filed: Dec. 17, 2010

(65) Prior Publication Data

US 2011/0160969 A1 Jun. 30, 2011

(30) Foreign Application Priority Data

Dec. 25, 2009 (JP) ................................ 2009-294669
Jan. 20, 2010 (JP) ................................ 2010-010203

(51) Int. Cl.
*F16H 61/662* (2006.01)
*F16H 61/66* (2006.01)

(52) U.S. Cl.
CPC .................. *F16H 61/66259* (2013.01); *F16H 2061/6616* (2013.01); *Y10T 74/2014* (2015.01); *Y10T 74/20018* (2015.01); *Y10T 74/20159* (2015.01)

(58) Field of Classification Search
CPC ................................................ F16H 61/66259
USPC ........................................................... 701/52
See application file for complete search history.

(56) References Cited

U.S. PATENT DOCUMENTS 5,176,234 A * 1/1993 Reik et al. .................. 192/53.2
5,665,022 A * 9/1997 Niiyama ......................... 477/46
2003/0228953 A1* 12/2003 Aoki et al. ...................... 477/44
2008/0302203 A1* 12/2008 Dorn et al. ...................... 74/507
2009/0203481 A1* 8/2009 Nohara et al. ................ 475/150

FOREIGN PATENT DOCUMENTS

JP 10184875 A * 7/1998
JP 2005-195158 A 7/2005
JP 2005-201320 A 7/2005

* cited by examiner

*Primary Examiner* — Basil T. Jos
(74) *Attorney, Agent, or Firm* — McGinn I.P. Law Group, PLLC.

(57) ABSTRACT

A continuously variable transmission includes a continuous gear-change mechanism, a gear-change operating section to which a gear-change operation is input, and a gear-change controlling section changing a gear ratio of the mechanism according to the gear-change operation that is input from the operating section. A first gear-change operation and a second gear-change operation, performed subsequently to the first operation, or an input from a second gear-change operating section can be input to the operating section. The e controlling section is provided with the plural gear ratios for plural gears and previously set, causes the mechanism to perform, according to the first operation, a gear-change operation to a gear ratio for a next gear, and to perform, according to the second operation, a gear-change operation to an intermediate gear ratio set between the gear ratio for the next gear and a gear ratio for a second next gear.

16 Claims, 12 Drawing Sheets

CONTINUOUSLY VARIABLE TRANSMISSION

CROSS REFERENCE TO RELATED APPLICATIONS

The present application claims priority from Japanese Patent Application No. 2009-294669 filed in the Japan Patent Office on Dec. 25, 2009 and Japanese Patent Application No. 2010-010203 filed in the Japan Patent Office on Jan. 20, 2010, the entire contents of which are incorporated herein by reference.

BACKGROUND OF THE INVENTION

1. Field of the Invention

The present invention relates to a continuously variable transmission installed in a vehicle, such as an automobile. In particular, the present invention relates to a continuously variable transmission capable of selecting a gear ratio in accordance with an operation of a driver.

2. Description of the Related Art

As a transmission that changes the speed of an output of a power source (used for travel) of, for example, an engine of an automobile, a continuously variable transmission having a good fuel consumption rate during actual travel is increasingly used. For such a continuously variable transmission, a type provided with a so-called manual mode, in which any one gear ratio is selected from a plurality of gear ratios previously set in accordance with a gear-change operation of a driver, is proposed, in addition to a type that performs an automatic gear-change operation in which a gear ratio is automatically set in accordance with a request for a torque from a driver or a travel state of a vehicle.

In the manual mode, in general, gear ratios corresponding to, for example, approximately five to seven gears are previously set, and a gear ratio is successively changed to a gear ratio corresponding to a next gear in accordance with an upshift operation and a downshift operation of a driver.

Hitherto, as a related technology related to a continuously variable transmission provided with such a manual mode, for example, Japanese Unexamined Patent Application Publication No. 2005-195158 discusses a continuously variable transmission which, when a minimum value of an input number of rotations is set in accordance with a travel resistance of a vehicle and when a gear-change operation that causes the input number of rotations to become less than the minimum value is continuously performed, accepts such a gear-change operation. In addition, Japanese Unexamined Patent Application Publication No. 2005-201320 discusses a continuously variable transmission provided with a manual mode that, when a request is made for a braking operation without any gear-change operation, controls a gear ratio so that a predetermined input number of rotations is maintained, and that, when a request for a braking operation is less frequently made, maintains a current gear ratio.

In an existing continuously variable transmission provided with a manual mode, there exist, for example, a case in which when one gear ratio is selected from gear ratios corresponding to, for example, approximately five to seven gears, a suitable gear ratio cannot always be properly set in accordance with various travel states.

For example, when, for the purpose of providing a proper rising acceleration at a corner and of increasing a braking force of an engine brake, downshifting is performed for increasing the rotation speed of the engine, the rotation speed of the engine may not be sufficiently increased by downshifting by only one gear; and the rotation speed of the engine may become too high by downshifting by two gears.

SUMMARY OF THE INVENTION

Accordingly, it is an object of the present invention to provide a continuously variable transmission that can select a suitable gear ratio by a gear-change operation by a driver.

The present invention makes it possible to overcome the aforementioned problems by the following solving means.

According to an aspect of the present invention, there is provided a continuously variable transmission including a continuous gear-change mechanism that increases and decreases a speed of a rotational output of a driving source used for causing an automobile to travel, the continuous gear-change mechanism capable of continuously changing a gear ratio; a gear-change operating section to which a gear-change operation is input; and a gear-change controlling section that changes the gear ratio of the continuous gear-change mechanism in accordance with the gear-change operation that is input from the gear-change operating section. In the continuously variable transmission, a first gear-change operation and a second gear-change operation are capable of being input to the gear-change operating section, the second gear-change operation performed subsequently to the first gear-change operation. In addition, the gear-change controlling section is provided with a plurality of the gear ratios that correspond to a plurality of gears and that are previously set, causes the continuous gear-change mechanism to perform, in accordance with the first gear-change operation, a gear-change operation from a gear ratio for when the first gear-change operation is started to a gear ratio corresponding to a next gear, and causes the continuous gear-change mechanism to perform, in accordance with the second gear-change operation, a gear-change operation from the gear ratio for when the first gear-change operation is started to an intermediate gear ratio that is set between the gear ratio corresponding to the next gear and a gear ratio corresponding to a second next gear.

Accordingly, if the amount of change in the gear ratio is not sufficient by shifting to a next gear, and the amount of change in the gear ratio is excessive by shifting to the next second gear, when a second gear-change operation is performed, shifting to an intermediate gear ratio between the next gear and the second next gear can be performed, thereby making it possible to select a suitable gear ratio.

The gear-change operating section may include a first switch and a second switch, the first switch detecting the first gear-change operation, the second switch operating only when the first gear-change operation is performed and detecting the second gear-change operation. This makes it possible to properly detect the first and second gear-change operations, and to prevent the second gear-change operation from being input by an improper operation.

The gear-change operating section may include a movable operated member that is movable successively from a neutral position to a first position and a second position, the first position corresponding to the first gear-change operation, the second position corresponding to the second gear-change operation. This makes it possible to input the second gear-change operation by a simple operation by successively moving the movable operated member to the first position and to the second position.

A movement direction of the movable operated member from the neutral position to the first position may differ from a movement direction of the movable operated member from the first position to the second position. This makes it possible to prevent the second gear-change operation from being performed by an improper operation when a driver intends to perform the first gear-change operation.

An operational force for operating the movable operated member from the first position to the second position may be larger than an operational force for operating the movable operated member from the neutral position to the first position. This makes it possible to prevent an improper operation, and makes it possible for the driver to properly feel whether or not the second gear-change operation is performed.

The gear-change operating section may detect at least one of an operational force, an operational speed, and an operational acceleration of the second gear-change operation, and the gear-change controlling section may increase a gear-change speed of the continuous gear-change mechanism in accordance with an increase in the at least one of the operational force, the operational speed, and the operational acceleration. This makes it possible to reflect in the control of the gear-change mechanism whether the driver intends to finish the gear-change operation in a short time or intends to perform a gear-change operation that results in, for example, little shock even if the gear-change operation takes a long time. Therefore, the driver can perform a gear-change operation that is faithful to the intention of the driver.

The gear-change controlling section may cause the continuous gear-change mechanism to perform the gear-change operation to the intermediate gear ratio only when the second gear-change operation is continued for a predetermined time or more than the predetermined time. This makes it possible to, when the second gear-change operation is performed only for a short time by mistake, more reliably prevent an improper operation by not performing a gear-change operation to an intermediate gear ratio in accordance with the second gear-change operation that is performed only for a short time by mistake.

The gear-change controlling section may cause the intermediate gear ratio to change from a side of the gear ratio corresponding to the next gear to a side of the gear ratio corresponding to the second next gear in accordance with an increase in a duration time of the second gear-change operation. This makes it possible to select a more suitable intermediate gear ratio reflecting the intention of the driver by causing the intermediate gear ratio to change in accordance with the duration of the second gear-change operation.

If the duration time of the second gear-change operation becomes greater than or equal to a predetermined upper limit time, the gear-change controlling section may set the intermediate gear ratio to a predetermined upper limit value. This makes it possible to prevent the gear ratio from being indefinitely changed even if the driver continues performing the second gear-change operation for an excessively long time.

If the duration time of the second-gear operation becomes greater than or equal to a predetermined threshold value, the gear-change controlling section may cause the continuous gear-change mechanism to perform a gear-change operation to the gear ratio corresponding to the second next gear. This makes it possible to select a suitable gear ratio by performing a gear-change operation to the gear ratio corresponding to the second next gear when the driver intends to perform a gear-change operation in which a change in gear ratio is greater than that for the intermediate gear ratio.

The movable operated member of the gear-change operating section may be movable within a predetermined range when the second gear-change operation is performed, and the gear-change controlling section may set the intermediate gear ratio in accordance with a position of the movable operated member in the predetermined range. This makes it possible to select a desired intermediate gear ratio in a short time by changing the position of the movable operated member.

The gear-change controlling section may include intermediate gear ratio storage means and rewriting means, the intermediate gear ratio storage means holding gear ratios that are previously set as a plurality of the intermediate gear ratios, the rewriting means rewriting the plurality of gear ratios held in the intermediate gear ratio storage means. This makes it possible to select a more suitable gear ratio by rewriting settings of the intermediate gear ratios in accordance with the preference of the driver and the conditions of use characteristic of a vehicle.

The gear-change controlling section may hold a plurality of combinations of gear ratios that are previously set as a plurality of the intermediate gear ratios, and include selecting means that allows a user to select any one of the plurality of combinations of the gear ratios. Accordingly, when a user selects a combination of gear ratios in accordance with, for example, the travel state, it is possible to select an intermediate gear ratio that is more suitable to the travel state, thereby making it possible to perform a proper gear-change operation.

The continuously variable transmission may further include acceleration detecting means that detects at least one of a deceleration, a slope descending acceleration, and a transverse acceleration acting upon a vehicle body, wherein if the at least one of the deceleration, the slope descending acceleration, and the transverse acceleration that is detected by the acceleration detecting means is greater than or equal to a predetermined value, the gear-change controlling section limits downshifting in accordance with the second gear-change operation. Accordingly, in the case where a vehicle tends to become unstable such as when braking, going down a slope, and turning a corner, it is possible to prevent the vehicle from becoming unstable when a gear-change operation to an intermediate gear ratio causes a driving force or a braking force of an engine brake to change by a large amount.

According to another aspect of the present invention, there is provided a continuously variable transmission including a continuous gear-change mechanism that increases and decreases a speed of a rotational output of a driving source used for causing an automobile to travel, the continuous gear-change mechanism capable of continuously changing a gear ratio; a first gear-change operating section to which a first gear-change operation is input; a second gear-change operating section to which a second gear-change operation is input, the second gear-change operation being performed simultaneously with or subsequently to the first gear-change operation; and a gear-change controlling section that changes the gear ratio of the continuous gear-change mechanism in accordance with the gear-change operations that are input from the first gear-change operating section and the second gear-change operating section. In the continuously variable transmission, the gear-change controlling section is provided with a plurality of the gear ratios that correspond to a plurality of gears and that are previously set, causes the continuous gear-change mechanism to perform, in accordance with the first gear-change operation, a gear-change operation from a gear ratio for when the first gear-change operation is started to a gear ratio corresponding to a next gear, and causes the continuous gear-change mechanism to perform, in accordance with the second gear-change operation, a gear-change operation from the gear ratio for when the first gear-change operation is started to an intermediate gear ratio that is set between the gear ratio corresponding to the next gear and a gear ratio corresponding to a second next gear. Accordingly, if the amount of change in the gear ratio is not sufficient by shifting to a next gear, and the amount of change in the gear ratio is excessive by shifting to the second next gear, when a second gear-change operation is performed, shifting to an intermediate gear ratio between the next gear and the second next gear can be performed, thereby making it possible to select a suitable gear ratio.

The first gear-change operating section may include a gear-change lever operated by a driver, and the second gear-change operating section may include an operating section provided at the gear-change lever and operated with the fingers of the driver. This makes it possible to move the entire gear-change lever to perform the first gear-change operation and, at the same time, to input the second gear-change operation with the fingers, so that the first and second gear-change operations can be easily and reliably performed.

The gear-change lever may be provided with a sensor that detects contact of a palm of the driver, and the gear-change controlling section may accept the second gear-change operation only when the sensor detects the contact of the palm. This makes it possible to prevent an improper operation because the second gear-change operation is accepted only when the driver is holding the gear-change lever.

If the first gear-change operation is input again after the first gear-change operation ends, the gear-change controlling section may cancel the second gear-change operation that is previously performed. This makes it possible to perform a gear-change operation reflecting the intention of the driver trying to select any gear ratio corresponding to an integral gear by the first gear-change operation.

The second gear-change operating section may detect at least one of an operational force, an operational speed, and an operational acceleration of the second gear-change operation, and the gear-change controlling section may increase a gear-change speed of the continuous gear-change mechanism in accordance with an increase in the at least one of the operational force, the operational speed, and the operational acceleration. This makes it possible to reflect in the control of the gear-change mechanism whether the driver intends to finish the gear-change operation in a short time or intends to perform a gear-change operation that results in, for example, little shock even if the gear-change operation takes a long time. Therefore, the driver can perform a gear-change operation that is faithful to the intention of the driver.

The gear-change controlling section may cause the continuous gear-change mechanism to perform the gear-change operation to the intermediate gear ratio only when the second gear-change operation is continued for a predetermined time or more than the predetermined time. This makes it possible to, when the second gear-change operation is performed only for a short time by mistake, more reliably prevent an improper operation by not performing a gear-change operation to the intermediate gear ratio in accordance with the second gear-change operation that is performed only for a short time by mistake.

The gear-change controlling section may cause the intermediate gear ratio to change from a side of the gear ratio corresponding to the next gear to a side of the gear ratio corresponding to the second next gear in accordance with an increase in a duration time of the second gear-change operation. This makes it possible to select a more suitable intermediate gear ratio reflecting the intention of the driver by causing the intermediate gear ratio to change in accordance with the duration of the second gear-change operation.

If the duration time of the second gear-change operation becomes greater than or equal to a predetermined upper limit time, the gear-change controlling section may set the intermediate gear ratio to a predetermined upper limit value. This makes it possible to prevent the gear ratio from being indefinitely changed even if the driver continues performing the second gear-change operation for an excessively long time.

If the duration time of the second-gear operation becomes greater than or equal to a predetermined threshold value, the gear-change controlling section may cause the continuous gear-change mechanism to perform a gear-change operation to the gear ratio corresponding to the second next gear. This makes it possible to select a suitable gear ratio by performing a gear-change operation to the gear ratio corresponding to the second next gear when the driver intends to perform a gear-change operation in which a change in gear ratio is greater than that for the intermediate gear ratio.

An input amount may be inputtable to the second gear-change operating section in a plurality of steps or continuously, and the gear-change controlling section may set the intermediate gear ratio in accordance with the input amount. This makes it possible to select a desired intermediate gear ratio in a short time by changing an input amount to the second gear-change operating section.

The gear-change controlling section may include intermediate gear ratio storage means and rewriting means, the intermediate gear ratio storage means holding gear ratios that are previously set as a plurality of the intermediate gear ratios, the rewriting means rewriting the gear ratios held in the intermediate gear ratio storage means. This makes it possible to select a more suitable gear ratio by rewriting settings of the intermediate gear ratios in accordance with the preference of the driver and the conditions of use characteristic of a vehicle.

The gear-change controlling section may hold a plurality of combinations of gear ratios that are previously set as a plurality of the intermediate gear ratios, and include selecting means that allows a user to select any one of the plurality of combinations of the gear ratios. Accordingly, when a user selects a combination of gear ratios in accordance with, for example, the travel state, it is possible to select an intermediate gear ratio that is more suitable to the travel state, thereby making it possible to perform a proper gear-change operation.

The continuously variable transmission may further include acceleration detecting means that detects at least one of a deceleration, a slope descending acceleration, and a transverse acceleration acting upon a vehicle body, wherein if the at least one of the deceleration, the slope descending acceleration, and the transverse acceleration that is detected by the acceleration detecting means is greater than or equal to a predetermined value, the gear-change controlling section limits downshifting in accordance with the second gear-change operation. Accordingly, in the case where a vehicle tends to become unstable such as when braking, going down a slope, and turning a corner, it is possible to prevent the vehicle from becoming unstable when a gear-change operation to the intermediate gear ratio causes a driving force or a braking force of an engine brake to change by a large amount.

As described, according to the present invention, it is possible to provide a continuously variable transmission that can select a suitable gear ratio by a gear-change operation by a driver.

DESCRIPTION OF THE PREFERRED EMBODIMENTS

The present invention makes it possible to provide a continuously variable transmission that can select a suitable gear ratio by a gear-change operation by a driver. This can be achieved by making it possible to select an intermediate gear ratio between a next gear and a second next gear when a second gear-change operation is subsequently performed to a first gear-change operation, which is an upshift/downshift operation to a gear ratio corresponding to the next gear, in a continuously variable transmission provided with a manual mode in which gear ratios corresponding to a plurality of gears are set.

First Embodiment

A continuously variable transmission according to a first embodiment to which the present invention is applied will hereunder be described. The continuously variable transmission according to the first embodiment is provided in, for example, an automobile such as a passenger car. The continuously variable transmission changes the speed (that is, increases and decreases the speed) of an output of an engine, and transmits the output to, for example, differentials at front and rear axles and AWD transfer devices.

Figure 1:
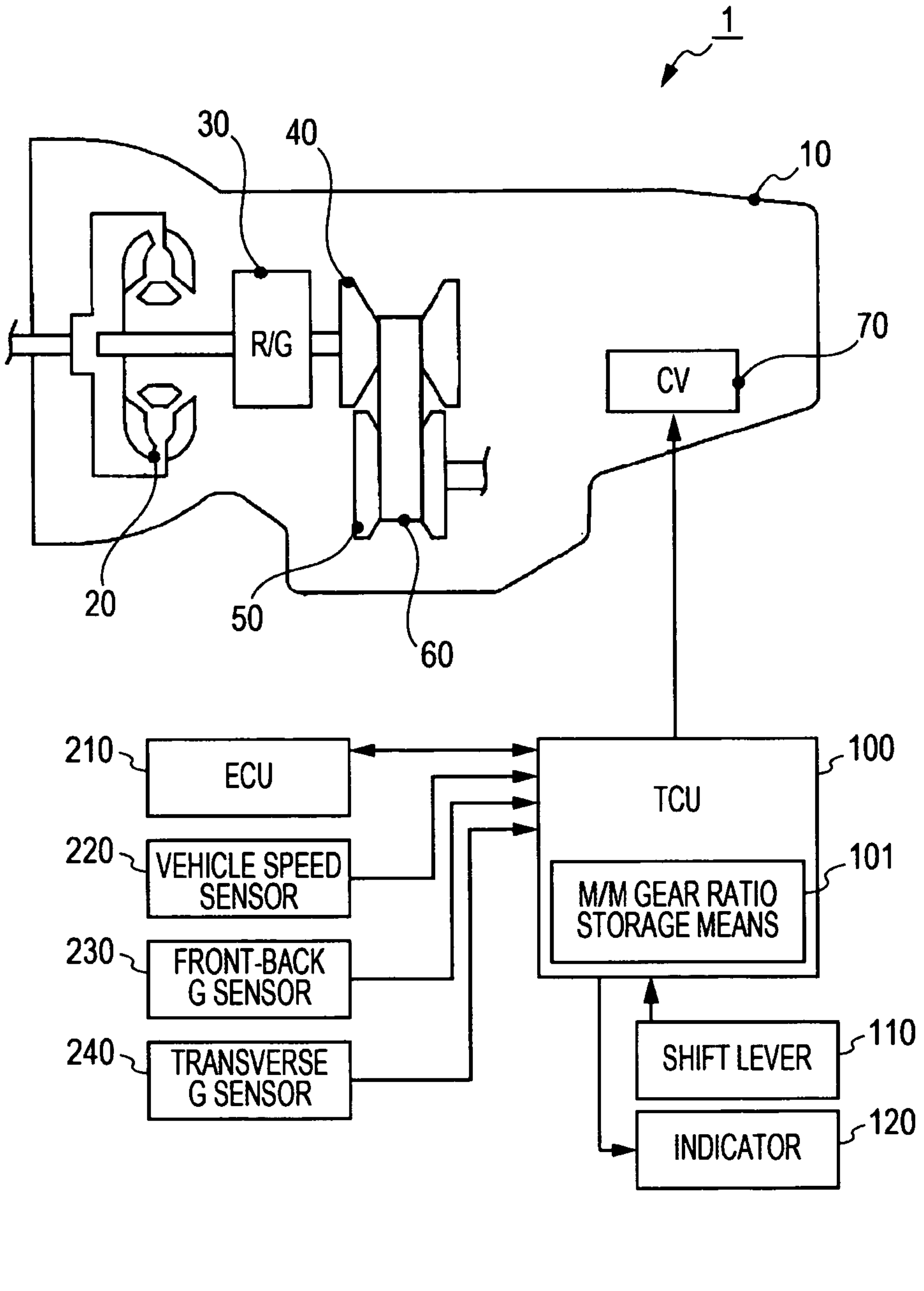
FIG. 1 is a schematic view of the structure of a continuously variable transmission according to a first embodiment to which the present invention is applied.

As shown in FIG. 1, the continuously variable transmission 1 includes, for example, a transmission case 10, a torque converter 20, a backward movement mechanical section 30, a primary pulley 40, a secondary pulley 50, a chain 60, a control valve 70, and a transmission control unit 100.

The transmission case 10 is a case in which each mechanical portion of the continuously variable transmission 1 is accommodated. The transmission case 10 is formed by, for example, performing a predetermined machining process after casting an aluminum alloy. A front end portion of the transmission case 10 (that is, a torque-converter-20-side end portion of the transmission case 10) is secured to a cylinder block of the engine (not shown).

In the first embodiment, an AWD transfer device and a front differential (not shown) are accommodated in the transmission case 10. Accordingly, the continuously variable transmission 1 is formed as what is called a transaxle.

The AWD transfer device distributes an output of a gear-change mechanism (that is, the secondary pulley 50 in the first embodiment) towards the front wheels and the rear wheels. The AWD transfer device includes, for example, a planetary-gear-type center differential and a transfer clutch that performs a differential limiting operation on the differential.

The front differential is a differential device that transmits front-wheel outputs of the AWD transfer device to the left and right front wheels, and that absorbs a differential rotation between the left and right wheels during turning.

Rear-wheel outputs of the AWD transfer device are transmitted to a rear differential (not shown) through a propeller shaft (not shown), and are distributed to the left and right rear wheels from the rear differential.

The torque converter 20 is a fluid coupling that is coupled to a rear end portion of a crank shaft of the engine (not shown). The torque converter 20 includes, for example, a pump impeller connected to the engine, a turbine runner driven by fluid flow from the pump impeller and connected to the backward movement mechanical section 30, and a stator disposed between the pump impeller and the turbine runner. The torque converter 20 also includes a lock-up mechanism that restricts a differential rotation between input and output sections when, for example, a vehicle is traveling at a high speed, and that is essentially directly connected.

The backward movement mechanical section 30 includes a planetary gear set that reverses an output rotation of the torque converter 20 when the vehicle is moving backward.

The primary pulley 40, the secondary pulley 50, and the chain 60 move in concert with each other to constitute a gear-change mechanism of a chain-type continuously variable transmission (CVT). The primary pulley 40 and the secondary pulley 50 are provided adjacent to each other while rotational center axes thereof are disposed parallel to each other. The chain 60 is provided between the primary pulley 40 and the secondary pulley 50, and transmits power between the primary pulley 40 and the secondary pulley 50.

The primary pulley 40 is a drive pulley that drives the secondary pulley 50 through the chain 60. The primary pulley 40 is connected to an output side of the backward movement mechanical section 30. The secondary pulley 50 is a driven pulley that is driven by the primary pulley 40 and the chain 60. The secondary pulley 50 is connected to an input side of the AWD transfer device.

The primary pulley 40 and the secondary pulley 50 each have a pair of tapering surfaces disposed so as to oppose each other in an axial direction. The chain 60 is interposed between the tapering surfaces. The primary pulley 40 and the secondary pulley 50 are such that, by changing the distance between the opposing tapering surfaces (that is, sheave distances), effective diameters of the pulleys can be continuously changed in a stepless manner to continuously change the gear ratio.

The control valve 70 includes unitized valves that adjust various control hydraulic pressures and flow rates in the continuously variable transmission 1.

The transmission control unit (TCU) 100 is a gear-change controlling section provided with an automatic mode and a manual mode. In the automatic mode, a gear ratio of the CVT is set on the basis of a travel state such as a driver request torque based on a request from an accelerator pedal. In the manual mode, a gear ratio of the CVT is set in accordance with a gear-change operation by the driver.

The transmission control unit 100 controls the control valve 70 of the continuously variable transmission 1, to control, for example, the gear ratio, a lock-up torque, and a transfer torque, and to switch between forward movement and backward movement of a vehicle.

In controlling a gear ratio, the transmission control unit 100 controls the sheave distance between each pulley so that the gear ratio of the CVT becomes a target gear ratio while feeding back an actual gear ratio.

The transmission control unit 100 includes gear ratio storage means 101 that holds data regarding combinations of gear ratios in the manual mode. The gear ratios in the manual mode will be described in more detail later.

A shift lever 110 to which the driver inputs a range changing operation and a manual gear-change operation is connected to the transmission control unit 100.

The shift lever 110 is, for example, a movable operated member that is provided at, for example, a center console of a vehicle and whose top end portion can be rotated in the front-rear direction and the left-right direction along a shift pattern described below.

Figure 2:
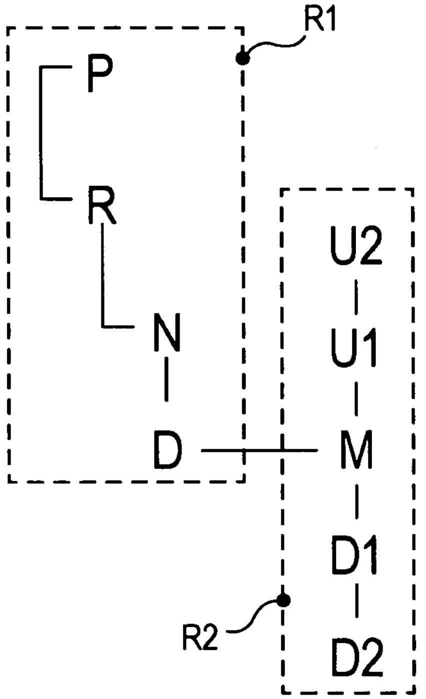
FIG. 2 shows a shift pattern of a shift lever of the continuously variable transmission shown in FIG. 1.

FIG. 2 shows a shift pattern of the shift lever 110.

The shift pattern of the shift lever 110 includes a range selection region R1 and a manual mode region R2.

The range selection region R1 includes a P position, an R position, an N position, and a D position.

The P position is used when, for example, a vehicle is parked. Selecting the P position causes an output shaft of the continuously variable transmission 1 to be mechanically locked.

The R position is a position that is reached when the shift lever 110 is successively moved, for example, leftward, backward, and rightward from the P position.

The R position is used when a vehicle is moving backward. Selecting the R position causes the backward movement mechanical section 30 to reverse an output of the torque converter 20, and causes the gear ratio of the gear-change mechanism (including the primary pulley 40, the secondary pulley 50, and the chain 60) to be fixed near a maximum deceleration value.

The N position is a position that is reached when the shift lever 110 is successively moved, for example, backward and rightward from the R position.

The N position is used when, for example, a vehicle is temporarily stopped. Selecting the N position causes the output shaft of the continuously variable transmission 1 to be in a free state in which driving force is not transmitted.

The D position is a position that is reached when the shift lever 110 is moved, for example, backward from the N position.

The D position is used when a vehicle is traveling forward on the basis of automatic gear-change. Selecting the D position causes the gear ratio of the gear-change mechanism to be automatically set on the basis of a travel state such as a rotation speed of the engine and a driver request torque based on a request from an accelerator pedal.

The manual mode region R2 includes an M position, a U1 position, a U2 position, a D1 position, and a D2 position.

In the manual mode region R2, the shift lever 110 is urged by a spring element, and returns to the M position in a non-operational state (that is, in a state in which the driver has moved his/her hand off the shift lever 110).

The M position is a position that is reached when the shift lever 110 is moved, for example, rightward from the D position. The automatic gear-change mode is switched to the manual mode by shifting the position from the D position to the M position.

The M position is a neutral position where the shift lever 110 is positioned when the driver does not change gears in the manual mode.

The U1 position is a position where the driver performs a first gear-change operation in an upshift direction. The U1 position is a position that is reached when the shift lever 110 is moved, for example, forward from the M position.

The U2 position is a position where the driver performs a second gear-change operation in the upshift direction. The U2 position is a position that is reached when the shift lever 110 is moved, for example, forward from the U1 position.

The D1 position is a position where the driver performs the first gear-change operation in a downshift direction. The D1 position is a position that is reached when the shift lever 110 is moved, for example, backward from the M position.

The D2 position is a position where the driver performs the second gear-change operation in the downshift direction. The D2 position is position that is reached when the shift lever 110 is moved, for example, backward from the D1 position.

The first and second gear-change operations will be described in detail later. The shift lever 110 is provided with a switch for detecting the first gear-change operation and a switch for detecting the second gear-change operation. The switch for detecting the second gear-change operation is activated only when the first gear-change operation has been performed (that is, when the D1 position or the U1 position is passed). Outputs of these switches are transmitted to the transmission control unit 100.

Except when the shift lever 110 is in the M position, the shift lever 110 is urged towards the M position. When the shift lever 110 is moved beyond the U1 position, and is at the U2 position, and when the shift lever 110 is moved beyond the D1 position, and is at the D2 position, urging forces at these positions are larger than those at the other positions, thereby requiring a larger operational force.

The shift lever 110 includes an operational-force sensor that detects an operational force of the driver when the shift lever 110 is moved from the U1 position to the U2 position, and an operational force of the driver when the shift lever 110 is moved from the D1 position to the D2 position.

An indicator 120, an engine control unit (ECU) 210, a vehicle speed sensor 220, a front-rear acceleration sensor 230, and a transverse acceleration sensor 240 are directly connected to the transmission control unit 100 or are indirectly connected to the transmission control unit 100 through, for example, an onboard LAN.

The indicator 120 includes a display device that displays the gear number corresponding to a currently selected gear ratio in the manual mode, and a sound output device that informs the driver by sound that a gear-change operation has been performed during a gear-change operation in the manual mode.

The engine control unit 210 performs overall control of the engine and auxiliary devices thereof (not shown). The engine control unit 210 provides items of information regarding, for example, a driver request torque and travel state such as the load and the rotation speed of the engine. The vehicle speed sensor 220 is provided at a hub of each wheel, and outputs a vehicle speed signal in accordance with the rotational speed of each wheel.

The front-rear acceleration sensor 230 detects acceleration in the front-rear direction acting upon a vehicle body. The transverse acceleration sensor 240 detects transverse acceleration acting upon the vehicle body.

Setting gear ratios in the manual mode in the continuously variable transmission 1 according to the first embodiment will hereunder be described.

Figure 3:
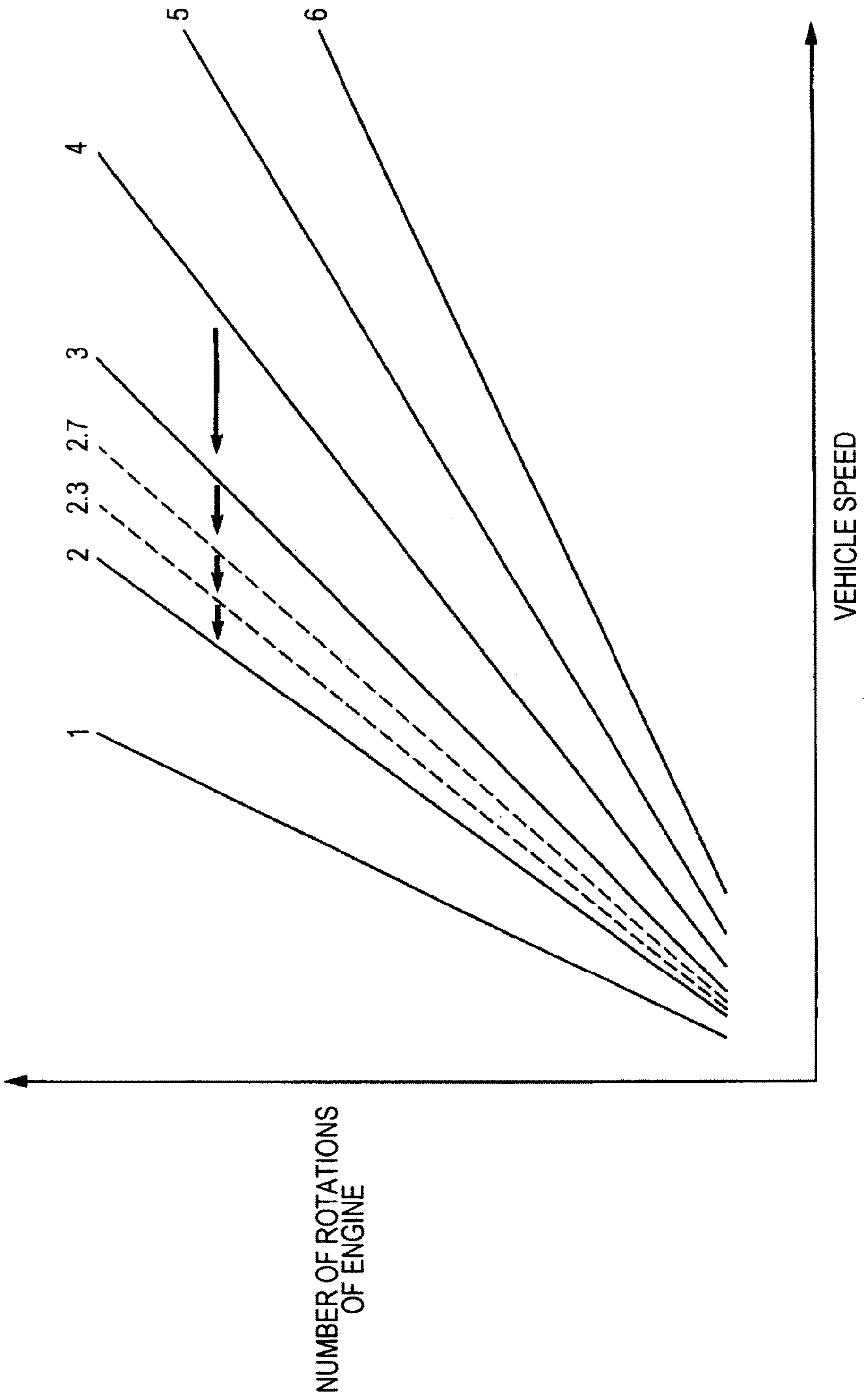
FIG. 3 shows settings of gear ratios in a manual mode in the continuously variable transmission shown in FIG. 1.

FIG. 3 shows settings of gear ratios in the manual mode. In FIG. 3, the horizontal axis represents the vehicle speed, and the vertical axis represents the rotation speed of the engine.

In the continuously variable transmission 1, gear ratios corresponding to integral gears of, for example, 6 gears (first gear, second gear, . . . sixth gear) are set. The gear ratios corresponding to the integral gears are successively set from a low-speed side (speed-decreasing side) to a high-speed side (speed-increasing side) in a predetermined step ratio.

The intermediate gear ratios are set between the gear ratios corresponding to the integral gears in the continuously variable transmission 1. In the first embodiment, for example, two intermediate gear ratios are set between the gear ratio corresponding to a certain integral gear and the gear ratio corresponding to a next gear (that is higher or lower by one gear). Here, to facilitate understanding, the intermediate gear ratios between an Nth gear and an (N+1)th gear are expressed as an (N+0.3)th gear and an (N+0.7)th gear from the Nth gear. That is, a 2.3th gear and a 2.7th gear are set between the second gear and the third gear shown in FIG. 3. The numbers after the decimal point are given for convenience sake, and need not precisely reflect actual gear ratios.

In the first embodiment, as described above, the intermediate gear ratios are set in steps between the gear ratios corresponding to the integral gears. However, in the present invention, as in fourth and sixth embodiments (described below) for example, the intermediate gear ratios are selectable continuously in a stepless manner in accordance with a mode of a second gear-change operation by the driver.

In FIG. 3 (and FIGS. 7A to 7C), the graph of the gear ratios corresponding to the integral gears and the graph of intermediate gear ratios are shown by solid lines and broken lines, respectively. In FIG. 3, only the intermediate gear ratios between the second gear and the third gear are shown.

The gear-change operation in the manual mode in the first embodiment will hereunder be described, taking the case in which downshifting is performed as an example.

Figure 4:
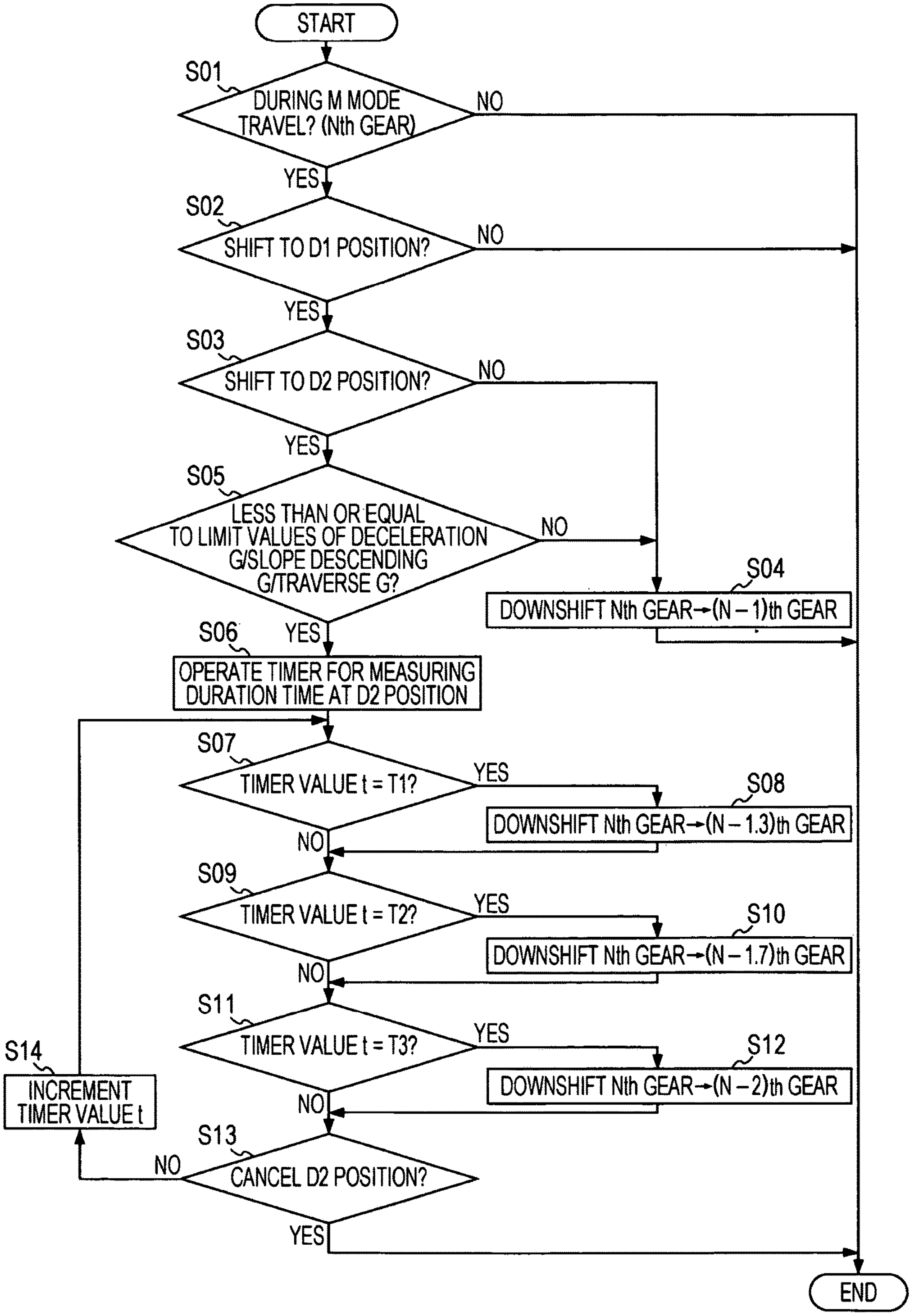
FIG. 4 is a flowchart showing downshift control in the manual mode in the continuously variable transmission shown in FIG. 1.

FIG. 4 is a flowchart schematically showing downshift control in the manual mode.

The steps thereof will be described below.

<Step S01: Temporary Stoppage of Travel in Manual Mode>

If the shift lever 110 is in the manual mode region R2, the transmission control unit 100 determines that a vehicle is traveling in the manual mode, and the process proceeds to Step S02. In contrast, if the shift lever 110 is in the range selection region R1, the process ends.

<Step S02: Determination as to Whether or not there is Shifting to D1 Position>

The transmission control unit 100 makes a detection as to whether or not the shift lever 110 has been shifted from the M position to the D1 position (first gear-change operation). If the shift lever 110 has been shifted to the D1 position, the process proceeds to Step S03. In contrast, if the shift lever 110 has not been shifted to the D1 position, the process ends.

<Step S03: Determination as to Whether or not there is Shifting to D2 Position>

The transmission control unit 100 makes a detection as to whether or not the shift lever 110 has been shifted from the D1 position to the D2 position (second gear-change operation). If the shift lever 110 has been shifted to the D2 position, the process proceeds to Step S05. In contrast, if the shift lever 110 has not been shifted to the D2 position, the process proceeds to Step S04.

<Step S04: Downshifting from Nth Gear to (N−1)Th Gear>

The transmission control unit 100 generates an instruction to the control valve 70, so that the gear ratio of the continuously variable transmission 1 is downshifted from a gear ratio corresponding to the Nth gear to a gear ratio corresponding to the (N−1)th gear. For example, when the vehicle is traveling in fourth gear as shown in FIG. 3, the fourth gear is downshifted to third gear.

At this time, the indicator indicates the gear number corresponding to the selected gear ratio, and outputs a signal sound, such as a buzzer sound. Thereafter, the process ends.

<Step S05: Determination as to Whether or not Deceleration G/Slope Descending G/Transverse G are Less than or Equal to Limit Values>

The transmission control unit 100 calculates deceleration, slope descending acceleration, and transverse acceleration acting upon a vehicle body on the basis of outputs of the vehicle speed sensor 220, the front-rear G sensor 230, and the transverse G sensor 240.

For example, the deceleration is calculated on the basis of a rate of change per time of the vehicle speed detected by the vehicle speed sensor 220.

The slope descending acceleration is calculated by excluding the influence of the aforementioned deceleration from the output of the front-back G sensor 230.

The transverse acceleration is calculated from the output of the transverse G sensor 240.

If the deceleration, the slope descending acceleration, and the transverse acceleration are all less than or equal to predetermined limit values, the process proceeds to Step S06. If at least one of the deceleration, the slope descending acceleration, and the transverse acceleration exceeds the limit value, the process proceeds to Step S04.

<Step S06: Operation of Timer that Measures Duration Time During which Shift Lever is at D2 Position>

The transmission control unit 100 activates a timer that measures a duration time during which the shift lever 110 is at the D2 position, and a timer value t is reset to zero. Then, the process proceeds to Step S07.

<Step S07: Determination of Whether Timer Value t=T1>

The transmission control unit 100 determines whether or not a current timer value t is essentially equal to T1, which is a preset predetermined value. If the timer value t is equal to T1, the process proceeds to Step S08. In contrast, if the timer value t is not equal to T1, the process proceeds to Step S09.

<Step S08: Downshifting from Nth Gear to (N−1.3)Th Gear>

The transmission control unit 100 generates an instruction to the control valve 70, so that the gear ratio of the continuously variable transmission 1 is changed to a gear ratio corresponding to an (N−1.3)th gear. For example, when the vehicle is initially traveling in fourth gear as shown in FIG. 3, the fourth gear is downshifted to 2.7th gear.

At this time, the indicator indicates the gear number corresponding to the selected gear ratio, and outputs a signal sound. In order to indicate to the driver that an intermediate gear ratio has been selected, this signal sound is different from the signal sound that is output for the aforementioned gear ratio corresponding to the integral gear. Then, the process proceeds to Step S09.

<Step S09: Determination of Whether Timer Value t=T2>

The transmission control unit 100 determines whether or not the current timer value t is essentially equal to T2, which is a preset predetermined value and is greater than T1 (T2>T1). If the timer value t is equal to T2, the process proceeds to Step S10. In contrast, if the timer value t is not equal to T2, the process proceeds to Step S11.

<Step S10: Downshifting from Nth Gear to (N−1.7)Th Gear>

The transmission control unit 100 generates an instruction to the control valve 70, so that the gear ratio of the continuously variable transmission 1 is changed to a gear ratio corresponding to an (N−1.7)th gear. For example, when the vehicle is initially traveling in fourth gear shown in FIG. 3, the fourth gear is downshifted to 2.3th gear. At this time, the indicator indicates the gear number corresponding to the selected gear ratio, and outputs the signal sound for the aforementioned intermediate gear ratio. Then, the process proceeds to Step S11.

<Step S11: Determination of Whether Timer Value t=T3>

The transmission control unit 100 determines whether or not the current timer value t is essentially equal to T3, which is a preset predetermined value and is greater than T2 (T3>T2). If the timer value t is equal to T3, the process proceeds to Step S12. In contrast, if the timer value t is not equal to T3, the process proceeds to Step S13.

<Step S12: Downshifting from Nth Gear to (N−2)Th Gear>

The transmission control unit 100 generates an instruction to the control valve 70, so that the gear ratio of the continuously variable transmission 1 is changed to a gear ratio corresponding to an (N−2)th gear. For example, when the vehicle is initially traveling in fourth gear as shown in FIG. 3, the fourth gear is downshifted to second gear. At this time, the indicator indicates the gear number corresponding to the selected gear ratio, and outputs a signal sound. In order to indicate to the driver that the downshifting by two gears has been performed, this signal sound is different from the signal sounds output for the aforementioned gear change by one gear and the aforementioned gear change to the intermediate gear ratios. Then, the process proceeds to Step S13.

<Step S13: Determination of Canceling D2 Position>

The transmission control unit 100 makes a detection as to whether or not the shift lever 110 has moved from the D2 position to another position such as the M position. If the shift lever 110 has moved to another position (that is, the D2 position has been canceled), the process ends. In contrast, if the shift lever 110 is still at the D2 position, the process proceeds to Step S14.

<Step S14: Incrementing Timer Value t>

The transmission control unit 100 adds a predetermined value to the timer value t of the timer that measures the duration time at the D2 position. Then, the process returns to Step S07, so that Step S07 and the subsequent steps are repeated.

Gear-change speeds (that is, movement speeds of movable sheaves of the primary pulley 40 and the secondary pulley 50) when downshifting to the aforementioned intermediate gear ratios and when downshifting to a gear ratio corresponding to an integral gear that is lower by two gears are set in accordance with operational forces generated when the driver moves the shift lever 110 from the D1 position to the D2 position; more specifically, the gear-change speeds are increased in accordance with an increase in the operation forces.

By the aforementioned control, when the driver shifts the shift lever 110 from the M position to the D1 position (first gear-change operation), a gear ratio corresponding to an integral gear that is lower by one gear (deceleration side) is selected. When the driver shifts the shift lever 110 to the D2 position through the D1 position (second gear-change operation), downshifting is successively performed by 1.3 gears, by 1.7 gears, and by two gears in accordance with the duration time during which the shift lever 110 is at the D2 position. After downshifting by two gears, the gear-change operation is no longer performed even if the shift lever 110 is still at the D2 position.

Selection of the intermediate gear ratios in the continuously variable transmission 1 is cancelled when a next first gear-change operation is performed. That is, when the vehicle is traveling in a (K+0.3)th gear or a (K+0.7)th gear, if the shift lever 110 is shifted to the D1 position, a Kth gear is selected, whereas, if the shift lever 110 is shifted to the U1 position, a (K+1)th gear is selected.

The aforementioned control is described in the case where downshifting is performed. The same control is essentially similarly performed when upshifting is performed. However, when upshifting is performed, driving force and braking force of an engine brake tend to be reduced, as a result of which the behavior of the vehicle is infrequently disturbed. Therefore, the deceleration, the slope descending acceleration, and the transverse acceleration need not always be considered.

The first embodiment that is described above can provide the following advantages:

(1) When, in a gear-change operation to a next gear corresponding to an integral-gear gear ratio, there is insufficient change in the gear ratio, and, when, in a gear-change operation to a second next gear, there is excessive change in the gear ratio, the shift lever 110 is shifted towards the D2 position and the U2 position (second gear-change operation), thereby making it possible to perform a gear-change operation to an intermediate gear ratio that is set between the integral-gear gear ratio corresponding to the next gear and the integral-gear gear ratio corresponding to the second next gear. This makes it possible to select a suitable gear ratio.

(2) By virtue of the structure in which the second gear-change operation is performed by successively moving the shift lever 110 from the D1 position or the U1 position to the D2 position or the U2 position, the second gear-change operation can be easily input by a simple operation.

(3) When the operational forces used for shifting from the D1 position to the D2 position and from the U1 position to the U2 position are made larger than the operational forces used for shifting from the M position to the D1 position and from the M position to the U1 position, the following are realized. That is, if the driver intends to perform the first gear-change operation, it is possible to prevent an improper operation, in which the second gear-change operation is performed by an erroneous operation, and to properly make a detection as to whether or not the driver has performed the second gear-change operation.

(4) By increasing the gear-change speed in accordance with the operational force used when shifting to the D2 position or the U2 position, it is possible to reflect in the gear-change control whether the driver intends to finish a gear-change operation in a short time or whether the driver intends to perform a gear-change operation that results in, for example, little shock even if the gear-change operation takes a long time. Therefore, the driver can perform the gear-change operation that is faithful to the intention of the driver.

(5) Even if the shift lever 110 is shifted to the D2 position or the U2 position, a gear-change operation to an intermediate gear ratio is not performed if the shift lever 110 does not remain at the D2 position or the U2 position during the time until the timer value t reaches T1. Therefore, it is possible to reliably prevent an improper operation.

(6) By successively changing the intermediate gear ratio in accordance with the duration time during which the shift lever 110 is at the D2 position or the U2 position, it is possible to select a suitable intermediate gear ratio that reflects the intention of the driver.

(7) After the timer value t reaches T3, a gear-change operation is not further performed after downshifting or upshifting by two gears. Therefore, even if the shift lever 110 is at the D2 position or the U2 position for an excessively long time, it is possible to prevent the gear ratio from changing indefinitely.

Second Embodiment

Next, a continuously variable transmission 2 according to a second embodiment to which the present invention is applied will hereunder be described. In each of embodiments below, parts that are substantially common to those of the previous embodiment will be given the same reference numerals and will not be described below. The differences will be primarily described.

Figure 5:
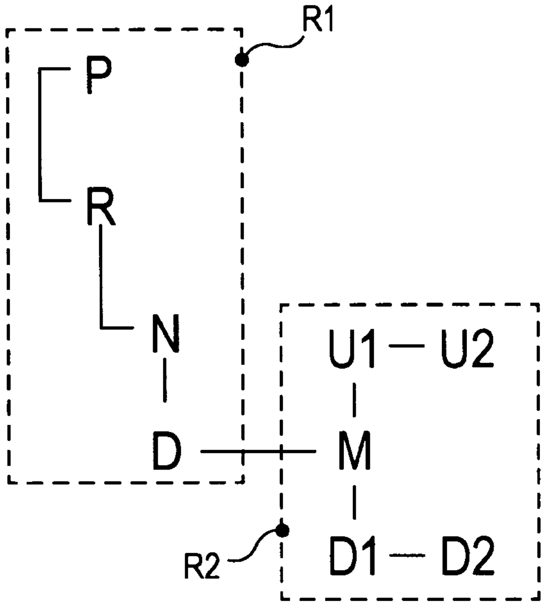
FIG. 5 shows a shift pattern of a shift lever of a continuously variable transmission according to a second embodiment to which the present invention is applied.

The continuously variable transmission 2 according to the second embodiment has the same structure as that according to the first embodiment except that the continuously variable transmission 2 is provided with a different shift pattern shown in FIG. 5. In the second embodiment, a U2 position and a D2 position are positions that are reached when a shift lever 110 is moved rightwards from a U1 position and a D1 position, respectively.

In addition to the advantages essentially similarly provided by the first embodiment, the aforementioned second embodiment provides an advantage in which, by causing an operation direction of a first gear-change operation and an operation direction of a second gear-change operation to differ from each other, a driver can be prevented from performing the second gear-change operation by mistake when the driver intends to perform the first gear-change operation.

Third Embodiment

Figure 6:
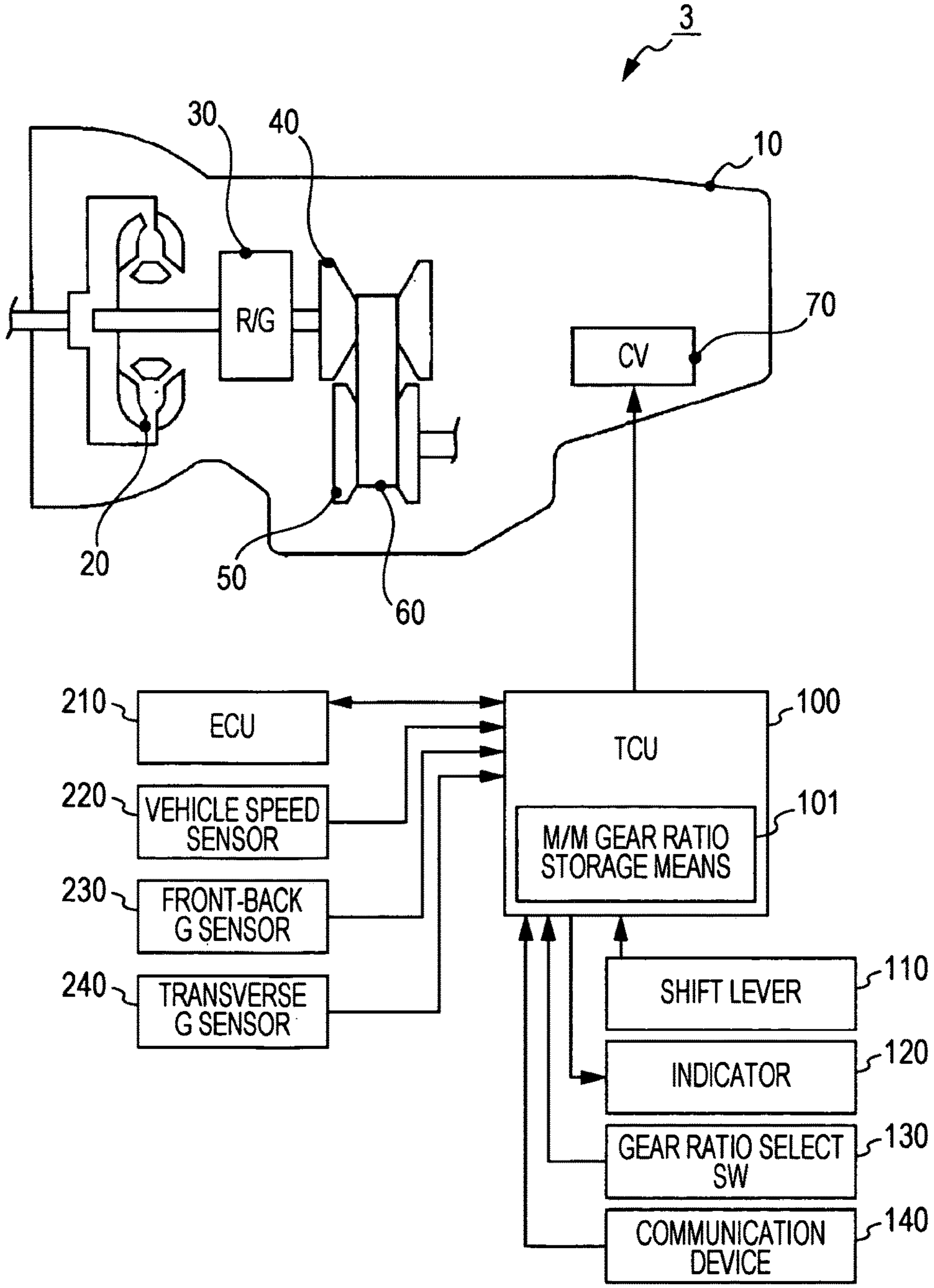
FIG. 6 is a schematic view of the structure of a continuously variable transmission according to a third embodiment to which the present invention is applied.

Next, a continuously variable transmission 3 according to a third embodiment to which the present invention is applied will hereunder be described. The continuously variable transmission 3 according to the third embodiment shown in FIG. 6 causes gear ratio storage means 101 of the transmission control unit 100 to store a plurality of sets of combinations of intermediate gear ratios and gear ratios corresponding to integral gears. In the continuously variable transmission 3, a gear ratio select switch 130 and a communication device 140 are connected to the transmission control unit 100.

Figure 7A:
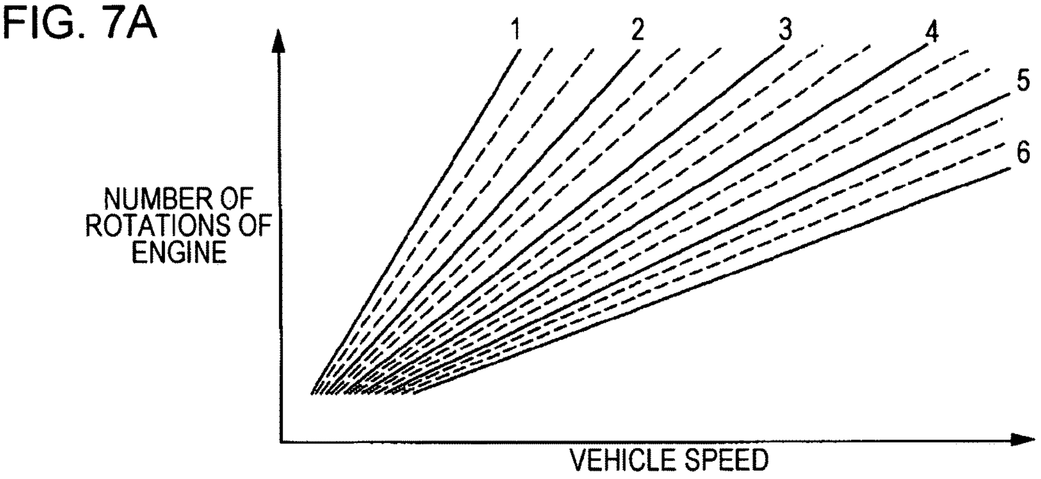
FIGS. 7A to 7C are graphs showing combinations of intermediate gear ratios and gear ratios corresponding to integral gears in the continuously variable transmission shown in FIG. 6.
Figure 7B:
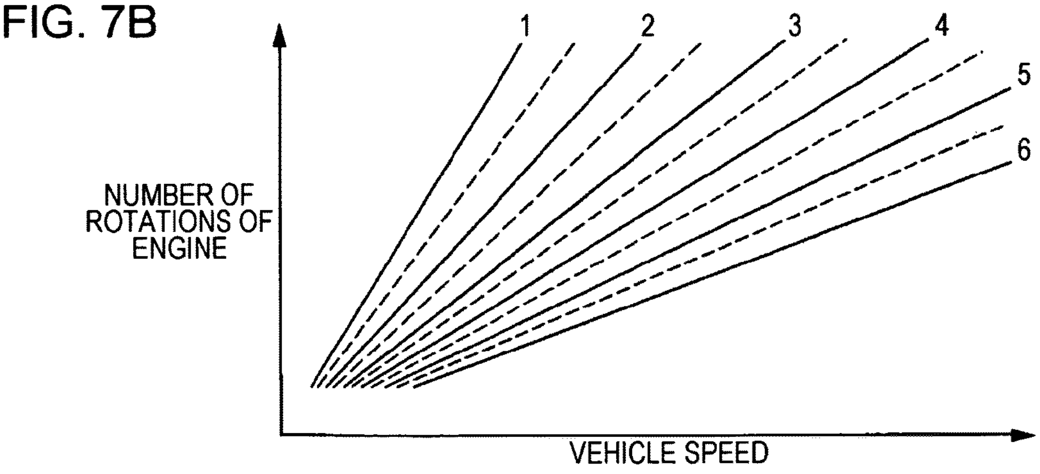

FIGS. 7A to 7B show exemplary combinations of intermediate gear ratios and gear ratios corresponding to integral gears stored in the gear ratio storage means 101.

FIG. 7A shows gear ratios that are similar to those in the aforementioned first embodiment, with integral-gear gear ratios corresponding to six gears being provided and two intermediate gear ratios being set between each integral-gear gear ratio.

FIG. 7B shows gear ratios corresponding to integral gears that are common to those shown in FIG. 7A, with one intermediate gear ratio being set between each integral gear ratio. Such a combination is suitable when selection of an intermediate gear ratio in the gear ratios shown in FIG. 7A is complicated.

Figure 7C:
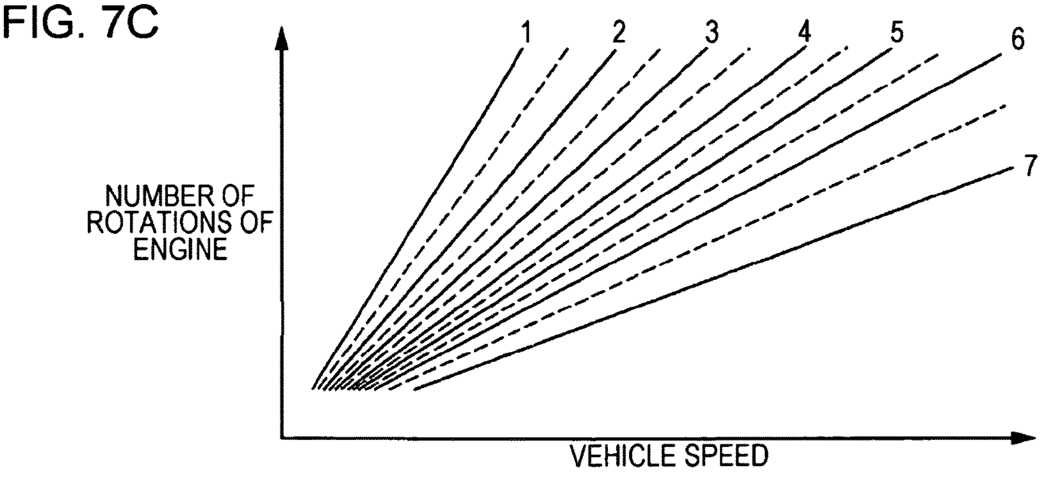

FIG. 7C shows a case in which first to sixth gears corresponding to integral-gear gear ratios are closer ratios than those shown in FIG. 7B, with a seventh gear being added and one intermediate gear ratio being set between each integral-gear gear ratio. With such a combination, the integral-gear gears are close ratios, so that an engine can be easily maintained at a high rotational speed; and an intermediate gear ratio can be selected if a desired number of rotations of the engine cannot be obtained with an integral gear, so that, for example, this combination is desirable when traveling in sports cars, such as in circuit traveling.

The gear ratio select switch 130 is provided at, for example, an instrument panel in a vehicle, and is used by a driver to select any one of the combinations of intermediate gear ratios and the integral-gear gear ratios.

The communication means 140 communicates with a server (not shown) through, for example, a network, such as the internet, and obtains data regarding the combinations of intermediate gear ratios and integral-gear gear ratios. The transmission control unit 100 has the function of rewriting the combinations of intermediate gear ratios and integral-gear gear ratios in the gear ratio storage means 101 on the basis of the data obtained through the communication means.

In addition to the advantages essentially similarly provided by the first embodiment, the aforementioned third embodiment provides the following advantages:

(1) When the driver selects a combination of intermediate gear ratios and integral-gear gear ratios in accordance with, for example, a travel state, it is possible to select a gear ratio that is suitable for the travel state, so that a proper gear-change operation can be performed.

(2) When the combination of intermediate gear ratios and integral-gear gear ratios are updated in accordance with the condition of use characteristic of the vehicle or the preference of the driver, it is possible to select a suitable gear ratio.

Fourth Embodiment

Figure 8:
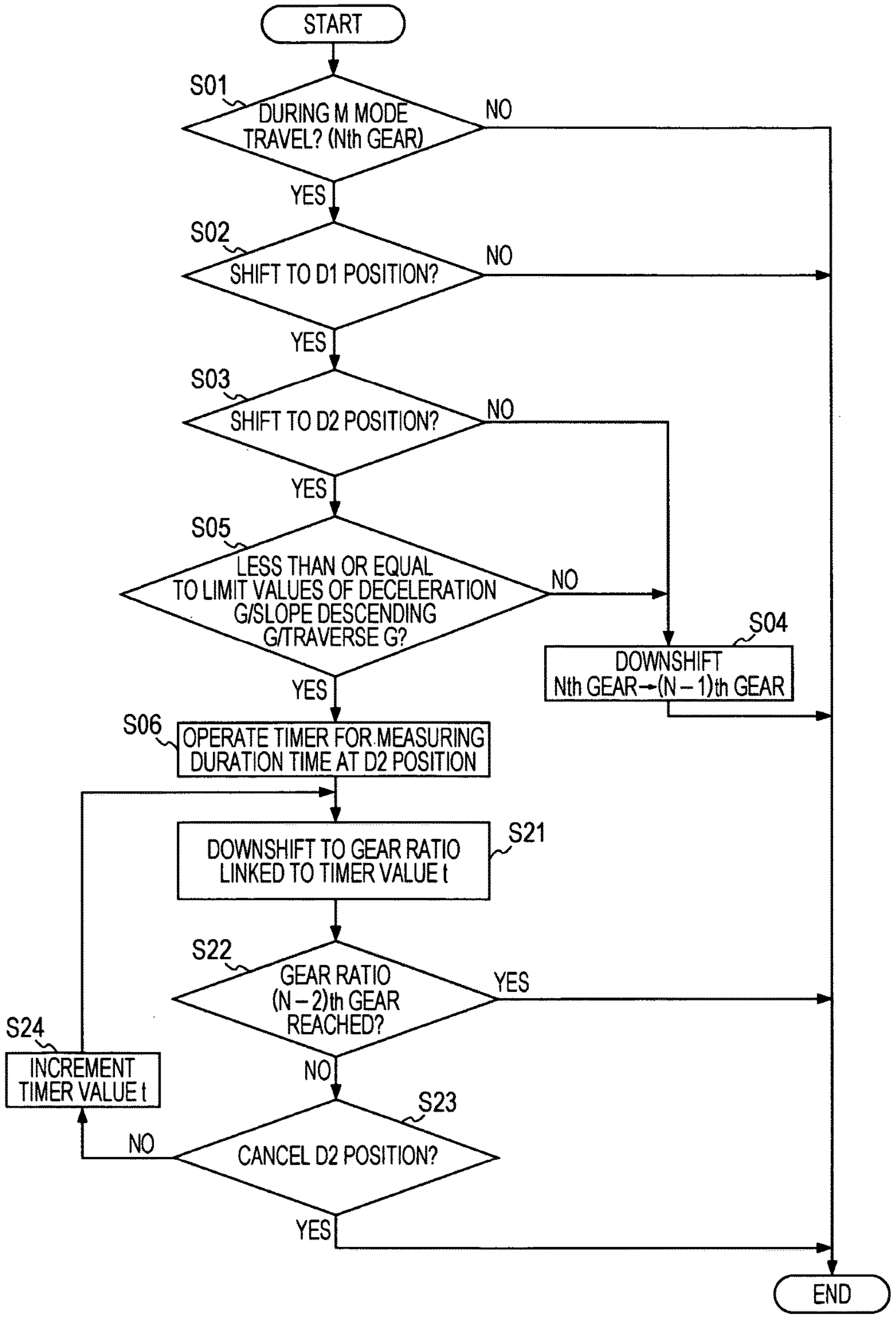
FIG. 8 is a flowchart showing downshift control in a manual mode in a continuously variable transmission according to a fourth embodiment to which the present invention is applied.

Next, a continuously variable transmission 4 according to a fourth embodiment to which the present invention is applied will hereunder be described. The continuously variable transmission 4 according to the fourth embodiment continuously sets an intermediate gear ratio in accordance with a duration time of a second gear-change operation. FIG. 8 is a flowchart schematically showing downshift control in a manual mode in the fourth embodiment. Steps S01 to S06 are common to those in the above-described first embodiment (see FIG. 4). Step S21 and the subsequent steps are performed immediately after Step S06. Therefore, they will be described in the order in which they are carried out.

<Step S21: Downshifting to Gear Ratio Linked to Timer Value t>

The transmission control unit 100 sets an intermediate gear ratio to a gear ratio linked to a timer value t. This intermediate gear ratio is a gear ratio corresponding to an integral (N−1)th gear in an initial state in which the timer value t=0; and, from this gear, continuously changes towards an (N−2)th gear in accordance with an increase in the timer value t. Then, the process proceeds to Step S22.

<Step S22: Determination as to Whether or not Gear Ratio Corresponding to (N−2)th Gear is Reached>

The transmission control unit 100 determines whether or not the intermediate gear ratio that changes in accordance with an increase in the timer value t has reached the gear ratio corresponding to the integral (N−2)th gear. If it has been reached, the process ends. If not, the process proceeds to Step S23.

<Step S23: Determination of Canceling D2 Position>

The transmission control unit 100 makes a detection as to whether or not the shift lever 110 has moved from the D2 position to another position such as the M position. If the shift lever 110 has moved to another position (that is, the D2 position has been canceled), the process ends. In contrast, if the shift lever 110 is still at the D2 position, the process proceeds to Step S24.

<Step S24: Incrementing Timer Value t>

The transmission control unit 100 adds a predetermined value to the timer value t of the timer that measures the duration time during which the shift lever 110 is at the D2 position. Then, the process returns to Step S21, so that Step S21 and the subsequent steps are repeated.

According to the above-described fourth embodiment, it is possible for a driver to continuously set the intermediate gear ratio, so that a suitable gear ratio can be selected under various travel states.

Fifth Embodiment

Next, a continuously variable transmission according to a fifth embodiment to which the present invention is applied will hereunder be described. In the fifth embodiment, a plurality of intermediate gear ratios that are set between an integral-gear gear ratio corresponding to a next gear and an integral-gear gear ratio corresponding to a second next gear are selected on the basis of the position (movement amount) of the shift lever 110 when a second gear-change operation is performed rather than on the basis of the duration time of a second gear-change operation as in, for example, the first embodiment.

Figure 9:
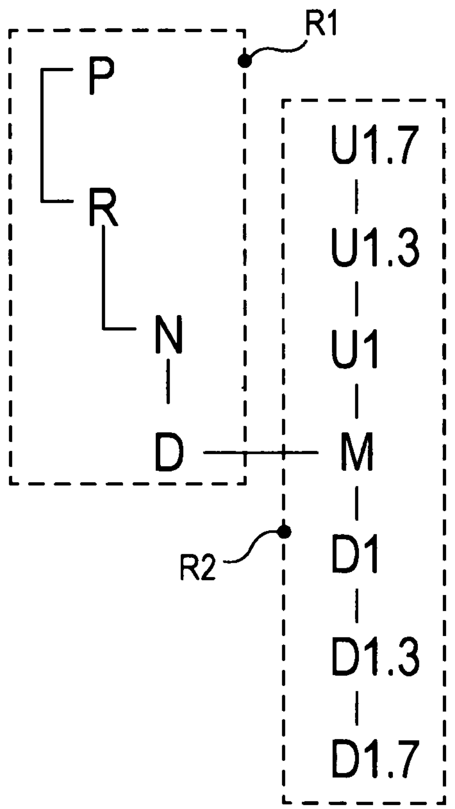
FIG. 9 shows a shift pattern of a shift lever in a continuously variable transmission according to a fifth embodiment to which the present invention is applied.

FIG. 9 shows a shift pattern of the shift lever 110 in the fifth embodiment. In the fifth embodiment, a U1 position, a U1.3 position, and a U1.7 position are successively situated forwardly of a M position in a manual mode region R2; and a D1 position, a D1.3 position, and a D1.7 position are successively situated rearwardly of the M position.

When, in performing downshifting, a driver moves the shift lever to the D1 position, the D1.3 position, and the D1.7 position, the downshifting is performed from a gear ratio corresponding to a current integral Nth gear to gear ratios corresponding to an (N−1)th gear, an (N−1.3)th gear, and an (N−1.7)th gear.

When, in performing upshifting, the driver moves the shift lever to the U1 position, the U1.3 position, and the U1.7 position, the upshifting is performed from a gear ratio corresponding to a current integral Nth gear to gear ratios corresponding to an (N+1)th gear, an (N+1.3)th gear, and an (N+1.7)th gear.

According to the above-described fifth embodiment, when an intermediate gear ratio involving a larger change is selected, it is not necessary to wait for a predetermined duration time, so that it is possible to select a desired gear ratio in a short time.

Sixth Embodiment

Figure 10:
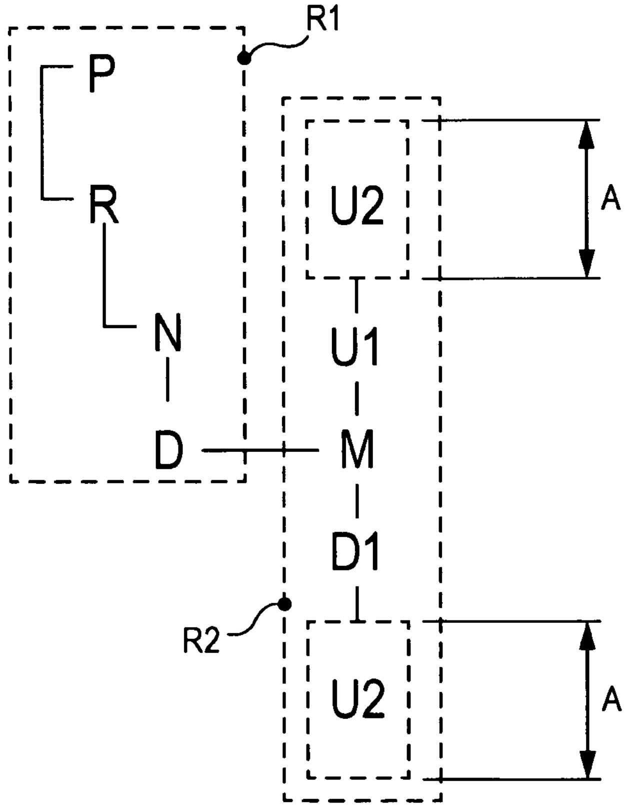
FIG. 10 shows a shift pattern of a shift lever in a continuously variable transmission according to a sixth embodiment to which the present invention is applied.

Next, a continuously variable transmission according to a sixth embodiment to which the present invention is applied will be described. FIG. 10 shows a shift pattern of the shift lever 110 in the sixth embodiment. In the sixth embodiment, a U2 position and a D2 position are each provided in a predetermined movable range A in which the shift lever 110 is movable. The shift lever 110 includes a position encoder that essentially continuously detects a position in each of the movable ranges A.

When, in performing downshifting, the shift lever 110 is moved to a D1 position, the downshifting is performed from a gear ratio corresponding to an integral Nth gear to a gear ratio corresponding to an (N−1)th gear.

When the shift lever 110 is moved within the movable range A of the D2 position, an intermediate gear ratio is continuously set within a range of from the gear ratio corresponding to the (N−1)th gear to a gear ratio corresponding to an (N−2)th gear in accordance with the position in the movable range A. This intermediate gear ratio is set towards the gear ratio corresponding to the (N−2)th gear in accordance with an increase in the distance from the D1 position.

When, in performing upshifting, the shift lever 110 is moved to a U1 position, the upshifting is performed from a gear ratio corresponding to an integral Nth gear to a gear ratio corresponding to an (N+1)th gear.

When the shift lever 110 is moved within the movable range A of the U2 position, an intermediate gear ratio is continuously set within a range of from the gear ratio corresponding to the (N+1)th gear to a gear ratio corresponding to an (N+2)th gear in accordance with the position in the movable range A. This intermediate gear ratio is set towards the gear ratio corresponding to the (N+2)th gear in accordance with an increase in the distance from the U1 position.

In the movable range A, an operational force of the shift lever 110 is set so as to be continuously increased in accordance with the distance from the D1 position or the U1 position.

According to the above-described sixth embodiment, it is possible to continuously select the intermediate gear ratio in a short time.

Seventh Embodiment

Figure 11:
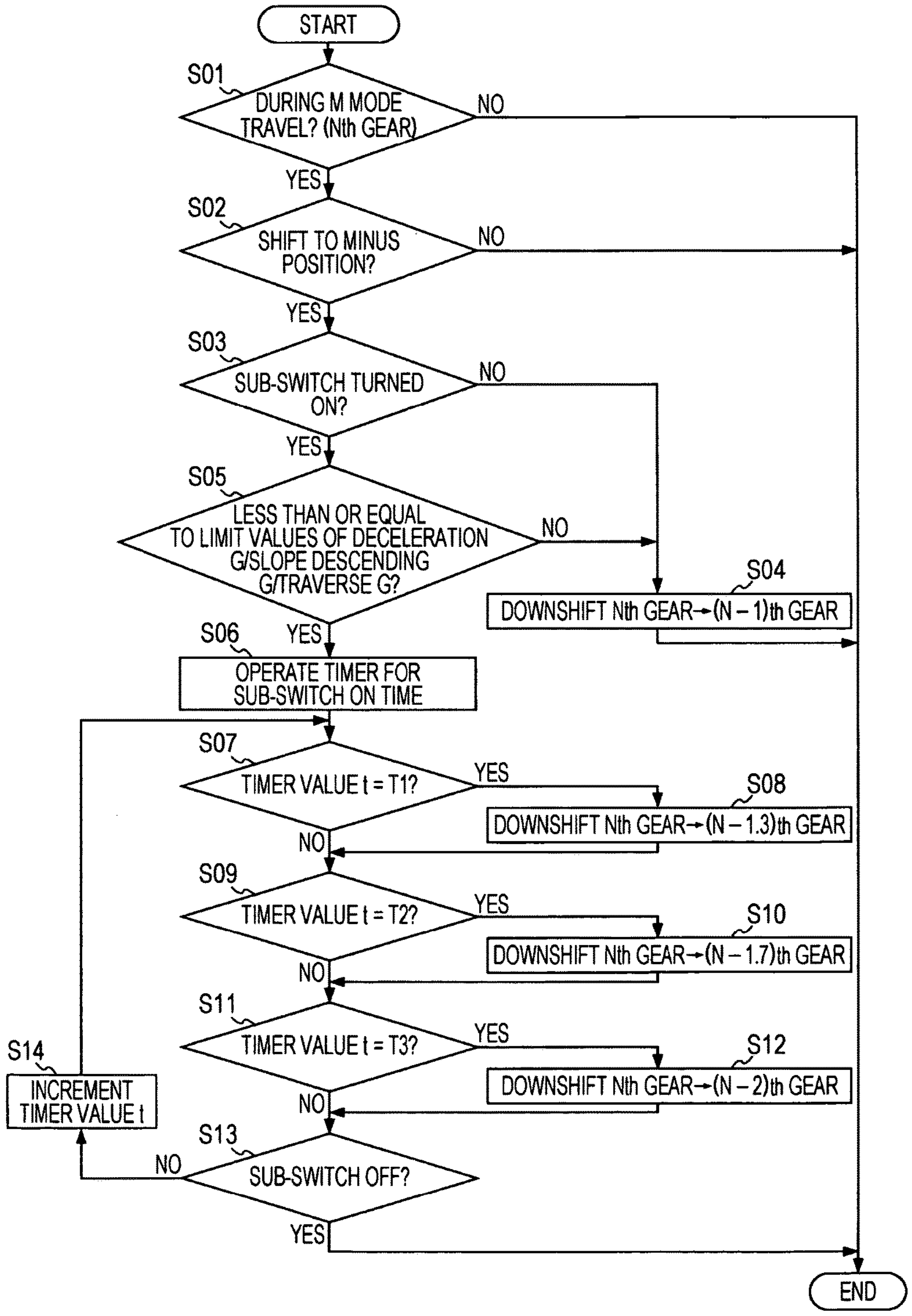
FIG. 11 is a flowchart schematically showing downshift control in a manual mode according to a seventh embodiment.

A continuously variable transmission according to a seventh embodiment to which the present invention is applied will hereunder be described. FIG. 11 is a flowchart schematically showing downshift control in a manual mode according to the seventh embodiment.

Figure 12:
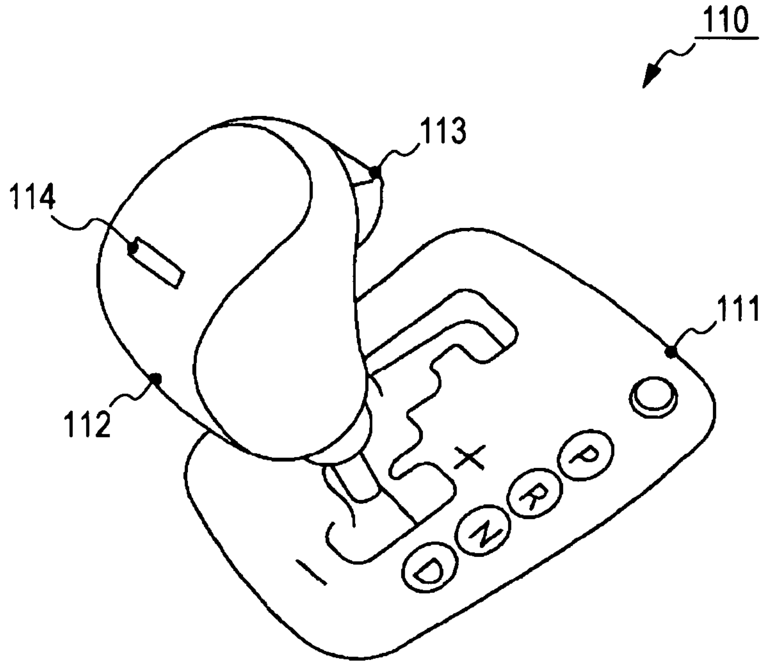
FIG. 12 is an external perspective view of a shift lever.

FIG. 12 is an external perspective view of a shift lever 110.

The shift lever 110 is formed so as to include, for example, a base section 111, a lever section 112, a sub-switch 113, and a contact sensor 114.

The base section 111 is a portion that is secured to, for example, a center console and an instrument panel in a vehicle.

The lever section 112 is provided so as to protrude upward from the base section 111, and can be rotated in a front-rear direction and a left-right direction in accordance with a shift pattern described below around a pivot (not shown) provided in the base section 111.

The lever section 112 is a first gear-change operating section to which a first gear-change operation is input.

The sub-switch 113 is a pushbutton provided at a front portion of the lever section 112 near a top end portion of the lever section 112. The sub-switch 113 is a second gear-change operating section to which a second gear-change operation is input.

The contact sensor 114 is provided at the top end portion of the lever section 112, and is turned on when a driver grips the lever section 112.

The sub-switch 113 and the contact sensor 114 are disposed at positions where they contact the fingers and the palm of the driver when the driver grips the lever section 112 in an ordinary driving posture.

The sub-switch 113 includes an operational-force sensor that detects an operational force when the driver pushes the sub-switch 113.

<Step S01: Determination of Traveling in Manual Mode>

If the lever section 112 of the shift lever 110 is in the manual mode region R2, the transmission control unit 100 determines that a vehicle is traveling in the manual mode, and the process proceeds to Step S02. In contrast, if the lever section 112 is in the range selection region R1, the process ends.

<Step S02: Determination of Whether or not there is Shifting to Minus Position>

The transmission control unit 100 makes a detection as to whether or not the lever section 112 of the shift lever 110 has been shifted from the M position to a minus position (first gear-change operation). If the lever section 112 of the shift lever 110 has been shifted to the minus position, the process proceeds to Step S03. In contrast, if the lever section 112 of the shift lever 110 has not been shifted to the minus position, the process ends.

<Step S03: Determination of Whether Sub-Switch is Turned On>

The transmission control unit 100 makes a detection as to whether or not, in the shift lever 110, the contact sensor 114 is in an on state and the sub-switch 113 is turned on. If the contact sensor 114 and the sub-switch 113 have both been turned on at the same time that the lever section 112 is shifted to the minus position or within a predetermined time from the end of the shifting, the process proceeds to Step S05. In contrast, if at least one of the contact sensor 114 and the sub-switch 113 is turned off, it is determined that the driver does not intend to operate the sub-switch 113 or that the driver has performed an improper operation even if the sub-switch 113 has been operated, and the process proceeds to Step S04.

<Step S04: Downshifting from Nth Gear to (N−1)Th Gear>

The transmission control unit 100 generates an instruction to the control valve 70, so that the gear ratio of the continuously variable transmission is downshifted from the gear ratio corresponding to the Nth gear to the gear ratio corresponding to the (N−1)th gear. For example, when a vehicle is traveling in fourth gear shown in FIG. 3, the fourth gear is downshifted to the third gear.

At this time, the indicator indicates the gear number corresponding to the selected gear ratio, and outputs a signal sound, such as a buzzer sound.

Thereafter, the process ends.

<Step S05: Determination as to Whether or not Deceleration G/Slope Descending G/Transverse G are Less than or Equal to Limit Values>

The transmission control unit 100 calculates deceleration, slope descending acceleration, and transverse acceleration acting upon a vehicle body on the basis of outputs of the vehicle speed sensor 220, the front-back G sensor 230, and the transverse G sensor 240.

For example, the deceleration is calculated on the basis of a rate of change per time of the vehicle speed detected by the vehicle speed sensor 220.

The slope descending acceleration is calculated by excluding the influence of the aforementioned deceleration from the output of the front-back G sensor 230.

The transverse acceleration is calculated from the output of the transverse G sensor 240.

If the deceleration, the slope descending acceleration, and the transverse acceleration are all less than or equal to the previously set limit values, the process proceeds to Step S06. If at least one of the deceleration, the slope descending acceleration, and the transverse acceleration exceeds the limit value, the process proceeds to Step S04.

<Step S06: Operation of Timer that Measures Duration Time During which Sub-Switch is. On>

The transmission control unit 100 activates a timer that measures a duration time during which the sub-switch 113 of the shift lever 110 is on, and a timer value t is reset to zero. Then, the process proceeds to Step S07.

<Step S07: Determination of Whether Timer Value t=T1>

The transmission control unit 100 determines whether or not a current timer value t is essentially equal to T1, which is a preset predetermined value. If the timer value t is equal to T1, the process proceeds to Step S08. In contrast, if the timer value t is not equal to T1, the process proceeds to Step S09.

<Step S08: Downshifting from Nth Gear to (N−1.3)Th Gear>

The transmission control unit 100 generates an instruction to the control valve 70, so that the gear ratio of the continuously variable transmission is changed to the gear ratio corresponding to the (N−1.3)th gear. For example, when the vehicle is initially traveling in fourth gear shown in FIG. 3, the fourth gear is downshifted to 2.7th gear.

At this time, the indicator indicates the gear number corresponding to the selected gear ratio, and outputs a signal sound. In order to indicate to the driver that an intermediate gear ratio has been selected, this signal sound is different from the signal sound that is output for the aforementioned gear ratio corresponding to the integral gear.

Then, the process proceeds to Step S09.

<Step S09: Determination of Whether Timer Value t=T2>

The transmission control unit 100 determines whether or not the current timer value t is essentially equal to T2, which is a preset predetermined value and is greater than T1 (T2>T1). If the timer value t is equal to T2, the process proceeds to Step S10. In contrast, if the timer value t is not equal to T2, the process proceeds to Step S11.

<Step S10: Downshifting from Nth Gear to (N−1.7)Th Gear>

The transmission control unit 100 generates an instruction to the control valve 70, so that the gear ratio of the continuously variable transmission is changed to the gear ratio corresponding to the (N−1.7)th gear. For example, when the vehicle is initially traveling in fourth gear shown in FIG. 3, the fourth gear is downshifted to 2.3th gear. At this time, the indicator indicates the gear number corresponding to the selected gear ratio, and outputs a signal sound for the aforementioned intermediate gear ratio.

Then, the process proceeds to Step S11.

<Step S11: Determination of Whether Timer Value t=T3>

The transmission control unit 100 determines whether or not the current timer value t is essentially equal to T3, which is a preset predetermined value and is greater than T2 (T3>T2). If the timer value t is equal to T3, the process proceeds to Step S12. In contrast, if the timer value t is not equal to T3, the process proceeds to Step S13.

<Step S12: Downshifting from Nth Gear to (N−2)Th Gear>

The transmission control unit 100 generates an instruction to the control valve 70, so that the gear ratio of the continuously variable transmission is changed to the gear ratio corresponding to the (N−2)th gear. For example, when the vehicle is initially traveling in fourth gear shown in FIG. 3, the fourth gear is downshifted to second gear.

At this time, the indicator indicates the gear number corresponding to the selected gear ratio, and outputs a signal sound. In order to indicate to the driver that the downshifting by two gears has been performed, this signal sound is different from the signal sounds output for the gear change by one gear and the gear change to the aforementioned intermediate gear ratios.

Then, the process proceeds to Step S13.

<Step S13: Determination of Whether Sub-Switch is. On>

The transmission control unit 100 makes a detection as to whether or not the sub-switch 113 of the shift lever 110 has been turned off. If the sub-switch 113 of the shift lever 110 has been turned off (that is, the driver has moved his/her hand off the sub-switch 113), the process ends. In contrast, if the sub-switch 113 is still on, the process proceeds to Step S14.

<Step S14: Incrementing Timer Value t>

The transmission control unit 100 adds a predetermined value to the timer value t of the timer that measures the duration time during which the sub-switch 113 is on. Then, the process returns to Step S07, so that Step S07 and the subsequent steps are repeated.

Gear-change speeds (movement speeds of the movable sheaves of the secondary pulley 50 and the primary pulley 40) when downshifting to the aforementioned intermediate gear ratios and when downshifting by two gears to an integral-gear gear ratio are set in accordance with operational forces generated when the driver pushes the sub-switch 113. More specifically, the gear-change speeds are increased in accordance with an increase in the operation forces.

By the aforementioned control, when the driver shifts the shift lever 110 from the M position to a minus position (first gear-change operation), a gear ratio corresponding to an integral gear that is lower by one gear (deceleration side) is selected. When the driver turns on the sub-switch 113 simultaneously with or subsequently to the shifting of the shift lever 110 to the minus position (second gear-change operation), downshifting is successively performed by 1.3 gears, by 1.7 gears, and by two gears in accordance with the duration time during which the sub-switch 113 is turned on. After the downshifting by two gears, a gear-change operation is no longer performed even if the sub-switch 113 is still on.

Selection of the intermediate gear ratio in the continuously variable transmission is cancelled when a next first gear-change operation is performed. That is, when the vehicle is traveling in a (K+0.3)th gear or a (K+0.7)th gear, if the shift lever 110 is shifted to a minus position, a Kth gear is selected, whereas, if the shift lever 110 is shifted to a plus position, the (K+1)th gear is selected.

The aforementioned control is described in the case where downshifting is performed. The same control is essentially similarly performed when upshifting is performed. However, when the upshifting is performed, driving force and braking force of an engine brake tend to be reduced, as a result of which the behavior of the vehicle is infrequently disturbed. Therefore, the deceleration, the slope descending acceleration, and the transverse acceleration need not be always considered.

The seventh embodiment that is described above can provide the following advantages:

(1) When, in a gear-change operation to a next gear corresponding to an integral-gear gear ratio, there is insufficient change in the gear ratio, and, when, in a gear-change operation to a second next gear, there is excessive change in the gear ratio, the sub-switch 113 is operated (second gear-change operation), thereby making it possible to perform a gear-change operation to an intermediate gear ratio that is set between the integral-gear gear ratio corresponding to the next gear and the integral-gear gear ratio corresponding to the second next gear. Therefore, it is possible to select a suitable gear ratio.

(2) By virtue of the structure in which the second gear-change operation is performed using the sub-switch 113 provided near the top end portion of the lever section 112 that performs the first gear-change operation, the first and second gear-change operations can be easily and reliably input by a simple operation.

(3) By increasing the gear-change speed in accordance with the operational force of the sub-switch 113, it is possible to reflect in the gear-change control whether the driver intends to finish a gear-change operation in a short time or whether the driver intends to perform a gear-change operation that results in, for example, little shock even if the gear-change operation takes a long time. Therefore, the driver can perform a gear-change operation that is faithful to the intention of the driver.

(4) Even if the sub-switch 113 is turned on, a gear-change operation to an intermediate gear ratio is not performed when the sub-switch 113 does not remain on during the time until the timer value t reaches T1. Therefore, it is possible to prevent an improper operation.

(5) Even if the sub-switch 113 is turned on when the contact sensor 114 is not turned on, the turning on of the sub-switch 113 is made invalid, thereby making it possible to more reliably prevent an improper operation.

(6) By successively changing the intermediate gear ratio in accordance with the duration time during which the sub-switch 113 is on, it is possible to select a suitable intermediate gear ratio that reflects the intention of the driver.

(7) After the timer value t reaches T3, a gear-change operation is not further performed after downshifting or upshifting by two gears. Therefore, even if the sub-switch 113 is on for an excessively long time, it is possible to prevent the gear ratio from changing indefinitely.

Modifications

The present invention is not limited to the above-described embodiments, so that various modifications and changes may be made within the technical scope of the present invention.

(1) The structure of the continuously variable transmission is not limited to that of each of the embodiments, so that various changes may be made if necessary. For example, although, in each of the embodiments, the continuously variable transmission is a continuously variable transmission of a chain type, the structure of the continuously variable transmission is not limited to the chain type. The present invention is applicable to other types of continuously variable transmissions such as a belt type and a toroidal type. In addition, the installation position (such as the front and rear of a vehicle), the installation direction (such as vertical installation and transverse installation), driving method, and the structure of the AWD transfer device are not particularly limited.

(2) The structures of the inputting sections to which the first and second gear-change operations are input are not limited to the shift levers according to the above-described embodiments. Changes may be made if necessary. For example, what is called a paddle, provided so as to protrude from a steering column in a radial direction and performing gear-change operations by being moved in a front-rear direction, may be used to input the first and second gear-change operations. In addition, gear-change operating sections of other types may be used. Further, a structure in which a paddle shift, etc., and a shift lever are both provided and the first and second gear-change operations can be input from either one of the paddle shift and the shift lever may be used.

(3) Although, in the third embodiment, the combinations of the intermediate gear ratios and the integral-gear gear ratios in the gear ratio storage means 101 can be rewritten using the communication device, the present invention is not limited thereto. Data in the gear ratio storage means may be updated by other methods. For example, using a PC information processing terminal, it is possible to obtain new data or for a user himself/herself to provide the new data, to update data in the gear ratio storage means by communication between the information processing terminal and the gear-change controlling device or through an information storage medium that can be connected to the gear-change controlling device.

(4) Although, in each of the embodiments, the gear-change speed is set in accordance with the operational force when performing the second gear-change operation, the present invention is not limited thereto. The gear-change speed may be set in accordance with, for example, the acceleration that acts upon the gear-change operating members or the speed of the gear-change operations.

(5) Although, in, for example, the first embodiment, a gear-change operation to gear ratios that are greater than or equal to the gear ratio corresponding to the second next gear is limited even if the second gear-change operation is continued, the present invention is not limited thereto. A gear-change operation to a predetermined intermediate gear ratio or intermediate gear ratios that are greater than the predetermined intermediate gear ratio may be limited.

What is claimed is:

1. A continuously variable transmission, comprising:

a continuous gear-change unit to increase and decrease a speed of a rotational output of a driving source used for causing an automobile to travel, the continuous gear-change unit capable of continuously changing a gear ratio;

a gearshift lever that is capable of selecting by a driver a first position from a neutral position and a second position from the neutral position through the first position in a manual mode in an upshift direction or a downshift direction;

a timer that measures a duration time during which the gearshift lever is at the second position; and a gear-change controlling unit that calculates a gear ratio by adding a predetermined gear ratio of the manual mode to a gear ratio corresponding to the duration time during which the gearshift lever is at the second position when detecting that the gearshift lever is moved to the second position from the neutral position through the first position toward the upshift direction or the downshift direction in case of selecting the manual mode, wherein, in a case of a first gear-change operation, which is operated by moving the gearshift lever to the first position from the neutral position, the gear-change controlling unit performs gearshift from a present gear ratio to a next predetermined gear ratio of the manual mode, and wherein, in a case of a second gear-change operation, which is detected that the gearshift lever has moved from the neutral position to the second position through the first position, the gear-change controlling unit performs gearshift from the present gear ratio to an intermediate gear ratio that is added to the gear ratio corresponding to the duration time during which the gearshift is at the second position to a next predetermined gear ratio after the next predetermined gear ratio of the manual mode.

2. The continuously variable transmission according to claim 1, wherein the gear-change operating unit includes a first switch and a second switch, the first switch detecting the first gear-change operation in which the gearshift lever is moved from the neutral position to the first position, the second switch operating only when the first gear-change operation is performed and detecting the second gear-change operation.

3. The continuously variable transmission according to claim 1, wherein a movement direction of the gearshift lever from the neutral position to the first position differs from a movement direction of the gearshift lever from the first position to the second position.

4. The continuously variable transmission according to claim 1, wherein an operational force for operating the gearshift lever from the first position to the second position is larger than an operational force for operating the gearshift lever from the neutral position to the first position.

5. The continuously variable transmission according to claim 1, wherein the gear-change operating unit detects at least one of an operational force, an operational speed, and an operational acceleration of the second gear-change operation, and wherein the gear-change controlling unit increases a gear-change speed of the continuous gear-change unit in accordance with an increase in the at least one of the operational force, the operational speed, and the operational acceleration.

6. The continuously variable transmission according to claim 1, wherein the gear-change controlling unit causes the continuous gear-change unit to perform the gear-change operation to the intermediate gear ratio only when the second gear-change operation is continued for a predetermined time or more than the predetermined time.

7. The continuously variable transmission according to claim 1, wherein the gearshift lever is movable within a predetermined range when the second gear-change operation is performed, and wherein the gear-change controlling unit sets the intermediate gear ratio accordance with a position of the gearshift lever in the predetermined range.

8. The continuously variable transmission according to claim 1, wherein the gear-change controlling unit includes intermediate gear ratio storage means and rewriting means, the intermediate gear ratio storage means holding gear ratios that are previously set as a plurality of the intermediate gear ratios, the rewriting means rewriting the gear ratios held in the intermediate gear ratio storage means.

9. The continuously variable transmission according to claim 1, wherein the gear-change controlling unit holds a plurality of combinations of gear ratios that are previously set as a plurality of the intermediate gear ratios, and includes selecting means that allows a user to select any one of the plurality of combinations of the gear ratios.

10. The continuously variable transmission according to claim 1, further comprising acceleration detecting means that detects at least one of a deceleration, a slope descending acceleration, and a transverse acceleration acting upon a vehicle body, wherein, if the at least one of the deceleration, the slope descending acceleration, and the transverse acceleration that is detected by the acceleration detecting means is greater than or equal to a predetermined value, the gear-change controlling unit limits downshifting in accordance with the second gear-change operation.

11. The continuously variable transmission according to claim 1, wherein the gear-change controlling unit stops setting the intermediate gear ratio that is added the gear ratio corresponding to the duration time during which the gearshift is at the second position to the next predetermined gear ratio after the next predetermined gear ratio of the manual mode in a case of being reached the predetermined intermediate gear ratio.

12. A continuously variable transmission, comprising:

a continuous gear-change unit to increase and decrease a speed of a rotational output of a driving source used for causing an automobile to travel, the continuous gear-change unit capable of continuously changing a gear ratio;

a gearshift lever that is capable of selecting by a driver a first position from a neutral position and a second position from the neutral position through the first position in a manual mode in to an upshift direction or a downshift direction;

a timer that measures a duration time during which the gearshift lever is at the second position;

a first gear-change operating unit to which a first gear-change operation is input;

a second gear-change operating unit to which a second gear-change operation is input, the second gear-change operation being performed at a same time as the first gear-change operation or subsequently to the first gear-change operation; and a gear-change controlling unit that calculates a gear ratio by adding a predetermined gear ratio of the manual mode to a gear ratio corresponding to the duration time during which the gearshift lever is at the second position when detecting that the gearshift lever is moved to the second position from the neutral position through the first position toward the upshift or downshift direction in case of selecting the manual mode, wherein, in the first gear-change operation, which is operated by moving the gearshift lever to the first position from the neutral position, the gear-change controlling unit performs gearshift from a present gear ratio to a next-predetermined gear ratio of the manual mode, and wherein, in the second gear-change operation, which is detected that the gearshift lever has moved from the neutral position to the second position through the first position, the gear-change controlling unit performs gearshift from the present gear ratio to an intermediate gear ratio that is added to the gear ratio corresponding to the duration time during which the gearshift is at the second position to a next predetermined gear ratio after the next predetermined gear ratio of the manual mode.

13. The continuously variable transmission according to claim 12, wherein the first gear-change operating unit includes a gear-change lever operated by the driver, and the second gear-change operating unit includes an operating section provided at the gear-change lever and operated with fingers of the driver.

14. The continuously variable transmission according to claim 13, wherein the gear-change lever is provided with a sensor that detects contact of a palm of the driver, and wherein the gear-change controlling unit accepts the second gear-change operation only when the sensor detects the contact of the palm.

15. The continuously variable transmission according to claim 13, wherein, if the first gear-change operation is input again after the first gear-change operation ends, the gear-change controlling unit cancels the second gear-change operation that is previously performed.

16. The continuously variable transmission according to claim 13, wherein the second gear-change operating unit detects at least one of an operational force, an operational speed, and an operational acceleration of the second gear-change operation, and wherein the gear-change controlling unit increases a gear-change speed of the continuous gear-change unit in accordance with an increase in the at least one of the operational force, the operational speed, and the operational acceleration.

* * * * *